March 15, 1966 L. M. RIBOT 3,239,906
PROCESS FOR MAKING CENTRIFUGATED PIPES, AND
MACHINE FOR REALIZATION THEREOF
Filed Aug. 13, 1962 3 Sheets-Sheet 1

INVENTOR.
LUIS MUNTAÑOLA RIBOT
BY

March 15, 1966       L. M. RIBOT              3,239,906
           PROCESS FOR MAKING CENTRIFUGATED PIPES, AND
               MACHINE FOR REALIZATION THEREOF
Filed Aug. 13, 1962                      3 Sheets-Sheet 2
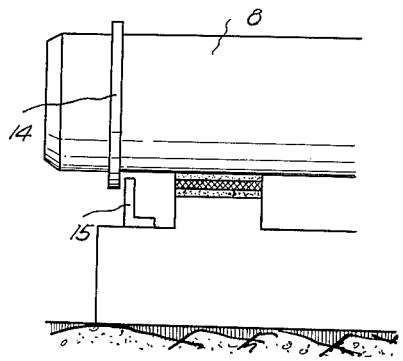
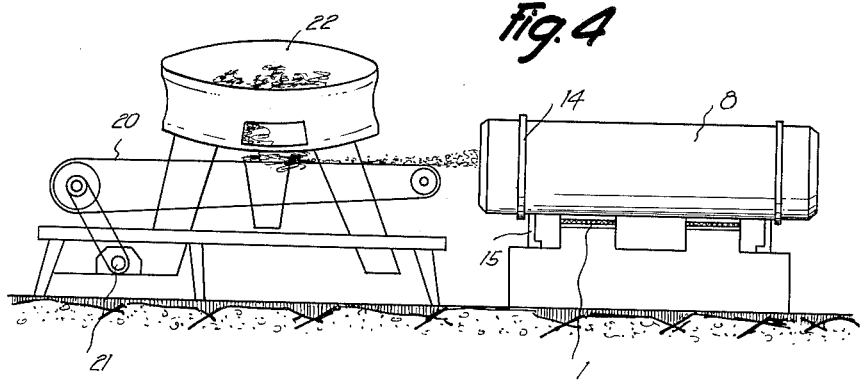
INVENTOR.
LUIS MUNTAÑOLA RIBOT March 15, 1966 L. M. RIBOT 3,239,906
PROCESS FOR MAKING CENTRIFUGATED PIPES, AND
MACHINE FOR REALIZATION THEREOF
Filed Aug. 13, 1962 3 Sheets-Sheet 3

INVENTOR.
LUIS MUNTAÑOLA RIBOT 3,239,906
PROCESS FOR MAKING CENTRIFUGATED PIPES, AND MACHINE FOR REALIZATION THEREOF
Luis Muntañola Ribot, Calle Ballmes 379,
Barcelona, Spain
Filed Aug. 13, 1962, Ser. No. 216,361
4 Claims. (Cl. 25—30)

This invention relates to apparatus for manufacturing of tubular articles such as pipe or the like by which such articles are produced automatically in a minimum of time by relatively unskilled labor.

The invention relates particularly to an apparatus for producing pipes or other tubular articles from a variety of materials by centrifugation by which such articles are formed automatically including the application of additional material thereto.

Heretofore, pipe and other tubular articles have been produced by centrifugation; however, most of the prior devices have required intermittent operation so that material could be introduced into the molds or forms and such forms could be placed in the machine and after the articles were formed, the molds could be removed. This has required a large number of skilled or semi-skilled workmen and consequently the production costs have been relatively high.

It is an object of the invention to overcome the deficiencies enumerated and to provide an apparatus for automatically producing tubular articles by centrifugation in a minimum of time and with minimum effort by introducing material into a mold, rotating the mold and material at a speed sufficient to compress and compact the material against the mold and thereafter discharging the mold from the machine while the machine continues to operate.

Another object of the invention is to provide apparatus for moving molds with material therein from a loading station in which the molds are operated at one speed to a compressing station in which the molds are rotated at a different speed and subsequently moving said molds to a discharge station.

A further object of the invention is to provide apparatus for loading material into a mold and distributing the material evenly throughout the mold from a position exteriorly thereof.

Figure 1:
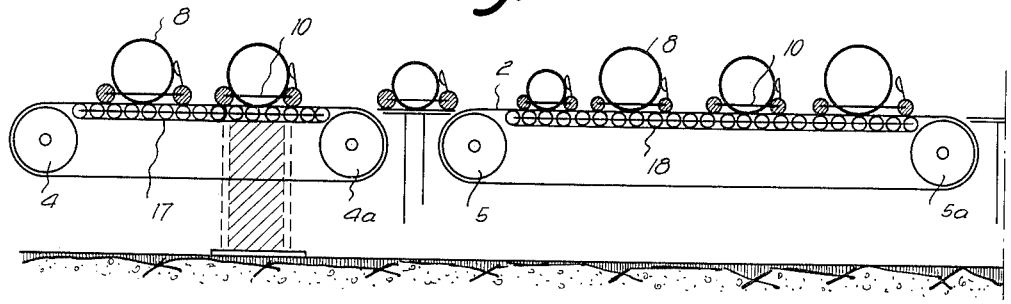
Figure 1A:
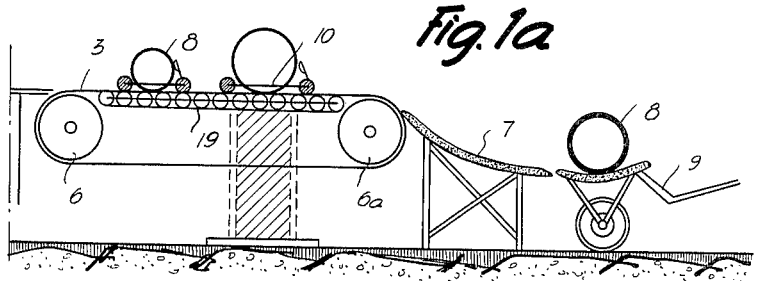
Figure 2:
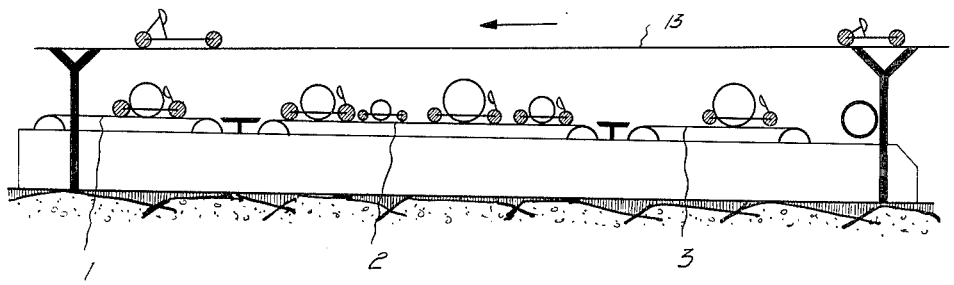
Figure 5:
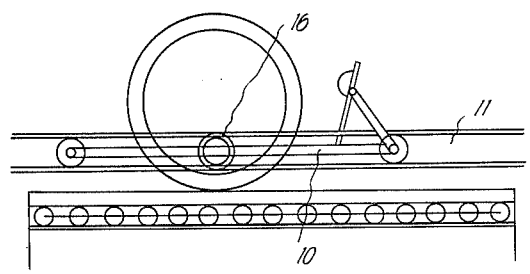
Figure 6:
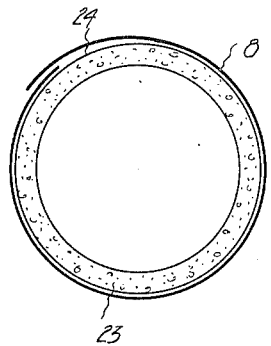

Other objects and advantages of the invention will be apparent from the following description taken in conjunction with the accompanying drawings in which:

FIG. 1 is a diagrammatic side elevation of one end of the invention;

FIG. 1a, a diagrammatic side elevation of the other end thereof;

FIG. 2, a diagrammatic side elevation to a reduced scale illustrating one means for returning the mold carriers to the loading station;

FIG. 3, an enlarged fragmentary front elevation of one of the molds and illustrating the mold guides;

FIG. 4, a front elevation illustrating the automatic loader means;

FIG. 5, an enlarged side elevation of the mold and mold carrier; and,

FIG. 6, an enlarged vertical section of a mold containing a centrifugated tubular member.

Briefly stated the present invention is a method and apparatus for forming tubular articles by centrifugation and includes a series of endless conveyor belts which are adapted to rotate a plurality of molds each of which is supported by a mold carrier. The first conveyor belt rotates the molds at a relatively slow speed so that moldable material can be inserted therein and evenly distributed throughout the molds and the second conveyor belt rotates the molds at a relatively high speed to compact the material by centrifugal force after which the molds are discharged from the machine. If desired a subsequent operation such as coatings, waterproofing, plasticizing, smoothing, etc. within the tubular articles can be performed on a third conveyor belt before the molds are discharged from the machine.

With continued reference to the drawings a plurality of endless conveyors 1, 2 and 3 are provided substantially in end-to-end relation with a transition table or platform located between each pair of conveyors. Conveyor 1 is mounted on pulleys 4 and 4a, conveyor 2 is mounted on pulleys 5 and 5a, and conveyor 3 is mounted on pulleys 6 and 6a. The conveyor 1 constitutes a loading station and is adapted to be driven at a relatively slow speed by any desired drive means (not shown). The conveyor 2 preferably is substantially longer than the conveyor 1 and constitutes a compression or compaction station and is adapted to be driven at a relatively high speed by a conventional drive means (not shown). The conveyor 3 is adapted to be driven at a relatively slow speed so that a finishing coat can be applied to the interior of a tubular article within the molds. If desired a fixed conveyor or ramp 7 can be provided adjacent to the discharge end of the conveyor 3 for braking the rotation of molds 8 used in forming the articles and for discharging the molds from the machine onto a truck 9 or the like.

A plurality of molds 8 are provided of hollow generally cylindrical configuration and each of such molds is disposed within a carrier 10 mounted on guides 11 located along both sides of the endless conveyors and adapted to extend from one end of the machine to the other. The molds 8 are freely rotatable within the carriers and rest upon the conveyors when in operative position so that the movement of the conveyors will cause rotation of the molds without causing movement of the carriers. If desired the carriers can be releasably interconnected so that all the carriers in operation will be moved simultaneously or such carriers may be independently mounted on the guides 11 and moved in any desired manner as by impulses caused by the conveyors 1, 2 and 3. The guides 11 are provided with conventional stops (not shown) which engage portions of the carriers 10 to hold the carriers in fixed position while the conveyors are rotating the molds.

Each of the carriers is provided with an upwardly extending arm pivotally mounted thereon and such arm has a buffer 12 adjacent to the upper end. The arm is adapted to be fixed in any adjusted position so that the buffer 12 is disposed adjacent to the mold 8 in order to dampen vibrations created by the rapid altering of the rotation of the molds when moving from one conveyor onto an intermediate transition table, and from the table to the next conveyor.

An inclined track or plane 13 is provided which is at a higher elevation at the discharg end of the machine than it is at the loading end thereof. When a mold has been discharged from the machine such mold is removed from the carrier and the carrier is then placed on the track 13 where it will roll by gravity back to the loading end thereof. The track 13 may be located above and in spaced relation to the conveyor belts, as illustrated in FIG. 2, or if desired may be located adjacent to the same.

In order to prevent excessive axial or lateral displacement, each of the molds 8 is provided with an external annular flange 14 adjacent each end. A pair of guides 15 are provided, one at each side of the machine, having upwardly extending portions disposed adjacent to the flanges 14 of the molds so that upon axial movement of the molds 8 the flanges 14 will engage the guides 15 and prevent any additional axial movement.

To insure effective distribution of the material to be centrifugated throughout the interior of the mold, a roller 15 extends through and in spaced relation to the mold 8 and is rotatably mounted at each end on the carrier 10. When a desired amount of material has been deposited within the mold, in a manner which will be described later, as the mold is being rotated at a relatively slow speed by the conveyor 1 during the loading process, the roller 16 will distribute such material evenly throughout the mold to any desired thickness of material. Also the roller 16 will cause an initial compaction of the material.

In order to support the endless conveyors 1, 2 and 3, as well as to support the molds thereon, a plurality of rollers 17, 18 and 19 are disposed beneath the conveyors 1, 2 and 3, respectively. The rollers 17, 18 and 19 preferably are rotatably mounted in a permanent horizontal position to prevent deformation of the conveyors due to the weight of the molds and the material therein.

Relative to FIG. 4 an automatic mold loading mechanism is illustrated which includes an endless conveyor 20 driven by a motor 21 at a relatively high speed. Material to be centrifugated is loaded into a hopper or kneader 22 having a spout for discharging the material therein onto the conveyor 20. The hopper or kneader is adjustable lengthwise on the conveyor 20 so that when such conveyor is in alignment with the loading mouth of the mold the hopper is moved along the plane thereof to discharge material onto such conveyor.

Due to the high speed of the conveyor 20 the material which is loaded onto such conveyor adjacent to the discharge is discharged from the conveyor before it can build up momentum and therefore such material is projected only as far as the closest end of the mold. Material which is loaded onto the conveyor at the opposite end will build up sufficient momentum that it will be projected entirely across the mold and will be received at the opposite end thereof. Material which is loaded intermediate the ends of the conveyor 20 will build up varying amounts of momentum and accordingly will be projected varying distances into the mold so that the movement of the hopper 22 along the conveyor 20 will substantially control the amount of material in the mold, as well as the distribution thereof. The roller 16 within the mold also will assist in equally distributing the material throughout the length of the mold since the mold is rotating at a relatively slow speed by the conveyor 1 and the carrier is resting against a stop.

After the material in the mold has been compacted by the high speed conveyor 2 the mold and carrier are transferred to the finishing conveyor 3 which operates at a slower speed. On this conveyor material for providing a finished coating, such as waterproofing, plasticizing, smoothing and the like, can be projected into the mold in a manner similar to the mold loading mechanism and the bar 16 will evenly distribute such material throughout the interior periphery of the pipe.

When the material within the mold has set up sufficiently to retain its shape, the mold and carrier are discharged from the conveyor 3 onto the fixed conveyor or ramp 7 after which the carrier is returned to the loading end of conveyor 1 and the mold is placed on a truck for removal.

When the material being molded is concrete or other plastic material which requires extensive setting or hardening time and which could not be discharged from the mold immediately, it has been found that by inserting a relatively small amount of rapidly solidifying material, such as cement, chalk or the like, into the mold prior to the application of the moldable material and then applying a finishing coat of the same material, a jacket is formed which will harden rapidly so that the pipe can be removed from the mold and the mold can be reused. After the pipe has been removed it can be stored until the inner material has completely hardened.

In order to prevent the material being centrifugated from clinging to the mold, a rubber, plastic or other sheet or bag 24 can be placed on the interior of the mold prior to the introduction of the moldable material to facilitate the removal of the pipe 23 from the mold before or after the complete setting of the pipe.

In the operation of the device a mold 8 is placed within a carrier 10 and such carrier is moved along guides 11 until the mold engages the first conveyor 1 which is rotating at a relatively slow speed. The carrier and mold are moved along the length of the conveyor until the carrier encounters a stop at the loading station. At this point the mold is still in engagement with the conveyor 1 and continues to rotate even though the carrier is stopped. Moldable or plastic material is then projected into the mold by the loading conveyor 20 and such material is distributed throughout the mold by the action of the conveyor 20 as well as by a roller 16 mounted on the carrier 10 and disposed lengthwise of the mold. After the mold has been filled with sufficient material to make a pipe of the desired thickness the stops on the guides 11 are released and the carrier 10 is moved along the length of the conveyor and may be discharged onto an intermediate table or platform and subsequently onto the conveyor 2 which is travelling at a relatively high rate of speed. During the transition from one conveyor to another the mold is subjected first to a shock when the mold which has been rotating encounters the table which is fixed and tends to stop the rotation of the mold, and then when the mold engages the conveyor 2 which is travelling at a high rate of speed at which point the mold is substantially stopped. The reaction of the shock transmitted to the mold is countered by a buffer 12 mounted on the carrier and adapted to retain the mold within the carrier as well as to dampen most of the shock and vibrations.

When the mold is moved onto the conveyor 2 such mold is rotated at a high rate of speed which causes the material to be compacted by centrifugal force. The mold is retained on the conveyor 2 for a sufficient length of time to thoroughly compact the material and to allow at least partial setting up or hardening of the same. Since this operation requires a greater length of time the conveyor 2 is substantially longer than the conveyor 1 so that a continuous operation can be maintained. As an example, a conveyor 2 which is approximately ten times longer than conveyor 1 has been found satisfactory. As each mold is loaded at the loading station and moved onto the conveyor 2, another mold is discharged from the opposite end of such conveyor onto the finishing conveyor 3. On this conveyor a finishing or rapid setting material can be projected onto the inner periphery of the pipe and allowed to harden after which the mold and carrier are removed from the machine and the carrier is returned to the starting position.

It will be noted that each of the conveyors 1, 2 and 3 may be single or multiple conveyors disposed in parallel relation depending upon the mold dimensions, the load weight, the material being centrifugated, or for other reasons.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for making centrifugated pipes comprising a plurality of endless conveyors in end-to-end relation, said conveyors being rotated at varying speeds, a mold adapted to engage and be rotated by said conveyors, carrier means for controlling the movement of said molds along said conveyors, means for projecting material into said mold, and means for discharging said mold from said machine.

2. The structure of claim 1 including freely rotatable roller means disposed beneath each of said conveyors for supporting said mold.

3. The structure of claim 1 in which said mold includes an annular flange adjacent each end and guide means engageable with said flange when the mold is moved transversely to retain the mold on said conveyors.

4. The structure of claim 1 in which said means for projecting material includes an additional conveyor, hopper means for discharging material onto said additional conveyor, and means for moving said hopper means along said additional conveyor whereby the material will be distributed throughout said mold.

References Cited by the Examiner

UNITED STATES PATENTS

| | | | |
|---|---|---|---|
| 1,789,742 | 1/1931 | Halkyard | 25—30 |
| 1,927,467 | 9/1933 | Morgan | 22—65 |
| 1,936,376 | 11/1933 | Camerota | 22—65 |
| 1,944,168 | 1/1934 | Camerota. | |
| 1,955,760 | 4/1934 | Nichols | 264—245 |
| 2,349,213 | 5/1944 | Van Niekerk | 264—311 |
| 2,776,450 | 1/1957 | Boggs | 25—30 |
| 2,904,836 | 9/1959 | Jefferson et al. | 18—26 |
| 3,112,530 | 12/1963 | Boggs et al. | 18—26 |
| 3,121,266 | 2/1964 | Ewing | 25—30 XR |
| 3,132,387 | 5/1964 | Bibby | 25—30 XR |

FOREIGN PATENTS

306/31   8/1931   Australia.

WILLIAM J. STEPHENSON, *Primary Examiner.*

ALEXANDER H. BRODMERKEL, ALFRED L. LEAVITT, *Examiners.*